Aug. 18, 1942.                C. W. GADD                2,293,288
                           VIBRATION INDICATOR
                          Filed May 29, 1940
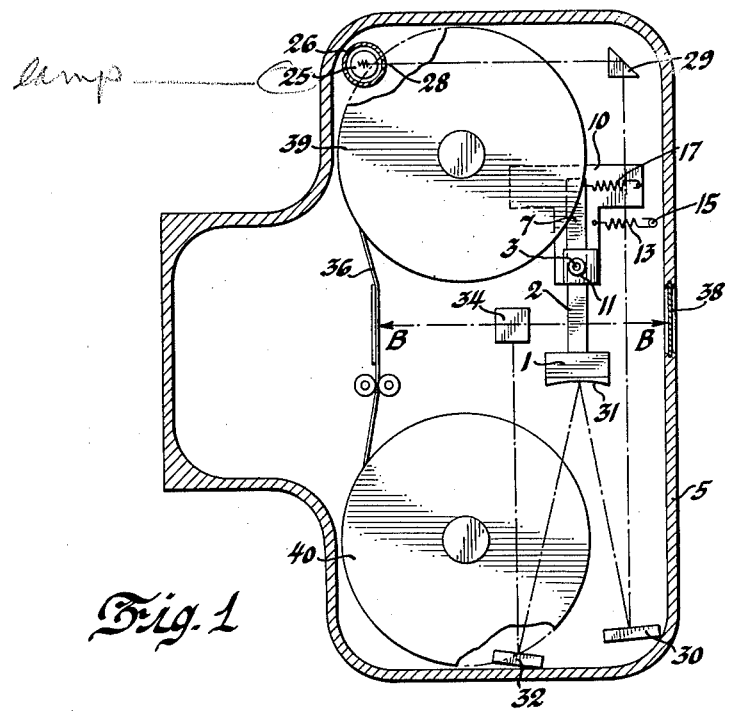
Fig. 1
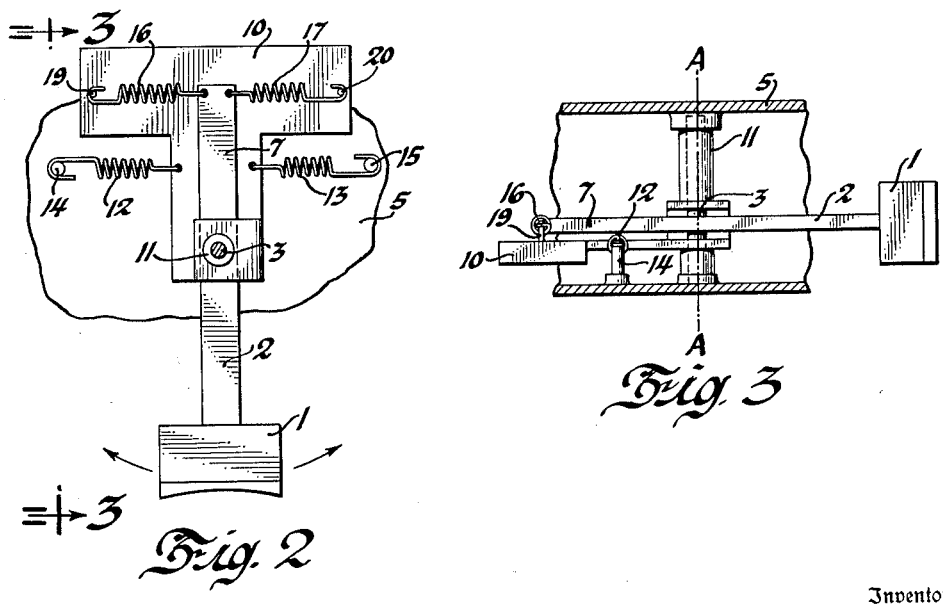
Fig. 2                                     Fig. 3
Inventor
Charles W. Gadd
By Blackmore, Spencer & Hurd
Attorneys Patented Aug. 18, 1942

2,293,288

UNITED STATES PATENT OFFICE 2,293,288

VIBRATION INDICATOR

Charles W. Gadd, Detroit, Mich., assignor to General Motors Corporation, Detroit, Mich., a corporation of Delaware Application May 29, 1940, Serial No. 337,911

3 Claims. (Cl. 73—51)

This invention relates to a vibration indicator pick up or vibration responsive device of the seismic type, having a mass whose oscillations under the influence of a vibratory force, may be used in conjunction with any suitable recording device, to measure and record the vibrations of any body to which the vibration responsive device may be secured.

The object of the invention is a device of the foregoing kind, which is responsive to vibrations in a given direction relatively to the device and its supporting framework or housing, irrespective of the position of the housing on the body to which it is secured.

The above and other objects of the invention will be apparent as the description proceeds.

According to the invention, the vibration responsive element is a mass capable of oscillating about an axis, and so counterweighted that its means position is at all times fixed in relation to its housing, regardless of the direction in which the force of gravity acts upon the element.

The drawing shows one construction of a device according to the invention, and as associated with an optical indicating and recording device.

In the drawing:

Fig. 1 is a view showing the vibration responsive device in assembled relationship with an associated optical indicating and recording device within a housing.

Fig. 2 is an enlarged view of a part of Fig. 1.

Fig. 3 is another view of the part shown in Fig. 2, as seen in the direction of the arrows 3—3 of Fig. 2.

Referring now more particularly to Figs. 2 and 3, the mass 1, which constitutes the vibration responsive element, is mounted on an arm 2, which is capable of oscillation in the manner shown by the arrows in Fig. 2, about the axis A—A (Fig. 3) of a spindle 3, to which it is secured. The spindle 3 has suitable bearings in a housing 5 for the device. The arm 2 has an extension 7 on that side of the axis A—A opposite to the mass 1.

A counterweight 10 for the mass 1, is secured to a tubular spindle 11, concentric with the spindle 3.

There are opposed tension springs 12 and 13 between opposite sides of the counterweight 10 and pegs 14 and 15 secured to the housing 5.

Between the extension 7 of the arm 2 of the mass 1, and pegs 19 and 20 respectively on the opposite arms of the counterweight 10, are opposed tension springs 16 and 17.

The springs 12 and 13 tend to hold the counterweight in a fixed position relatively to the housing, and the springs 16 and 17 tend to hold the extension 7, and consequently the mass 1, in a fixed position relatively to the counterweight 10.

The normal mean position of the associated parts of the mass 1 and its counterweight 10 are such that their centers of gravity are on opposite sides of the axis A—A and in a plane containing the axis A—A.

In order to balance the mass 1, the moment of the mass counterweight about the axis A—A, plus the moment of the mass of the extension 7 thereabout, must be equal to the moment of the mass 1, about the same axis.

The springs 12, 13, 16 and 17 are light springs of low rate and of themselves merely tend to maintain the mass 1 and its counterweight 10 in a constant median position, the springs 16, 17 also serving to transmit a gravitational balancing force from the counterweight 10 to the extension 7 of the mass 1 to balance any gravitational force tending to move the mass 1 about its axis A—A and away from a fixed median position relatively to the housing. The resilient connection of the counterweight to the mass 1 and its housing enables this to be done without interfering with vibrational oscillations of the mass 1 about its axis A—A.

The natural frequency of both the vibration responsive element and its counterweight means must of course be lower than the frequency of the vibrations to be measured, in order that resonance of the oscillating masses will not interfere with the amplitude of the vibrations of the vibration responsive element; the springs 12, 13, and 16, 17 have a rate sufficiently low to ensure this.

Whenever the vibration responsive device is in any position such that the force of gravity tends to displace the mass 1 from its mean position, the counterweight 10 exerts, through the springs 16 and 17, a correcting force of such a magnitude that the stationary position of the mass 1 remains fixed with respect to the housing 5.

Referring now particularly to Fig. 1, the housing 5 contains a light source provided by a lamp 25 within a shield 26 provided with a pin hole 28, through which a beam of light passes through a prism 29, thence to a mirror 30, and a concave mirror 31, secured to the mass 1. From the concave mirror 31, the beam is reflected to a mirror 32, and thence through a suitable arrangement of prisms shown generally at 34, in opposite directions on to a photographic film 36 for recording purposes, and on to a ground glass scaled screen 38 for visual observation, in well known manner. The film 36 is moved from one to the other of the spools 39 and 40, across the path of movement of the light beam, by any suitable driving means (not shown).

It will be appreciated that in use, the indicator is clamped to the part whose vibrations are to be measured, in such a position that the vibration responsive element is free to oscillate in the direction of the vibration component it is desired to record, i. e., such that the vibration component is in the direction B—B of Fig. 1.

Since the force of gravity is incapable of deflecting the mass I, the instrument can be used to measure the amplitude and frequency of a vibration in any direction, provided it is so disposed that the arm 2 is normal to the direction of vibration. Expressed otherwise, the mass I is automatically held in a constant mean position, so that, if for example it is arranged for measuring a specific vibration of an aeroplane wing, it will be effective to do so in any position of the aeroplane in the air.

Because the mean position of the vibration responsive element is at all times fixed with respect to the housing, no readjustment of the parts to bring the beam into proper registry with its scale is required, no matter whether the instrument is to be used for measuring vibrations in a vertical, a horizontal, or in any intermediate direction.

I claim:

1. A vibration responsive device comprising a housing, a mass mounted for oscillation about an axis in said housing, and counterweight means resiliently connected to said mass and said housing for oscillation relatively to said mass and said housing to maintain said mass in a constant mean position which is at all times fixed with respect to the housing regardless of the direction in which the force of gravity acts on the mass, the resilient connections comprising spring means tending to hold the counterweight means in a fixed position relatively to the housing, and spring means tending to hold the mass in a fixed position relatively to the counterweight means.

2. A vibration responsive device comprising, a housing, a mass having an arm mounted for oscillation about an axis in said housing, an extension of the arm on that side of the axis opposite to the mass, a counterweight for the mass, pivoted about the said axis, opposed spring means tending to hold the counterweight in a fixed position relatively to the housing, and opposed spring means tending to hold the extension of the arm in a fixed position relatively to the counterweight, whereby said mass is held in a constant mean position which is at all times fixed with respect to the housing.

3. The combination according to claim 2, in which the moment of the mass about its axis is equal to the moment of its extension arm plus the moment of the counterweight about the same axis, the natural frequencies of the mass and the counterweight with their spring means being lower than the lowest frequency to which the vibration responsive device is required to respond.

CHARLES W. GADD.